(12) United States Patent
Petersen et al.

(10) Patent No.: US 8,558,423 B2
(45) Date of Patent: Oct. 15, 2013

(54) STATOR-ARRANGEMENT

(75) Inventors: Jesper Elliot Petersen, Olgod (DK); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 270 days.

(21) Appl. No.: 13/078,179

(22) Filed: Apr. 1, 2011

(65) Prior Publication Data
US 2011/0248507 A1   Oct. 13, 2011

(30) Foreign Application Priority Data

Apr. 13, 2010   (EP) ..................................... 10159790

(51) Int. Cl.
*H02K 9/00* (2006.01)
(52) U.S. Cl.
USPC ............................................... 310/54; 310/59
(58) Field of Classification Search
USPC ....................................................... 310/52–59
See application file for complete search history.

(56) References Cited

U.S. PATENT DOCUMENTS

| 6,781,276 | B1 | 8/2004 | Stiesdal et al. | |
|---|---|---|---|---|
| 2007/0200440 | A1* | 8/2007 | Kalsi et al. | 310/54 |
| 2007/0216236 | A1* | 9/2007 | Ward | 310/54 |
| 2008/0001487 | A1* | 1/2008 | Wei et al. | 310/54 |
| 2009/0026771 | A1 | 1/2009 | Bevington et al. | |
| 2009/0261668 | A1* | 10/2009 | Mantere | 310/54 |
| 2010/0026111 | A1* | 2/2010 | Monzel | 310/59 |
| 2010/0102649 | A1* | 4/2010 | Cherney et al. | 310/54 |
| 2010/0176669 | A1* | 7/2010 | Houle et al. | 310/54 |
| 2010/0201129 | A1* | 8/2010 | Holstein et al. | 290/53 |

FOREIGN PATENT DOCUMENTS

| DE | 19749108 C1 | 4/1999 |
|---|---|---|
| DE | 10 2005043313 A1 | 3/2007 |
| EP | 2109208 A1 | 10/2009 |
| WO | WO 0121956 A1 | 3/2001 |

\* cited by examiner

*Primary Examiner* — Thanh Lam

(57) ABSTRACT

A stator-arrangement for a generator is disclosed. The stator arrangement includes a plurality of stator segments. Each of the plurality of stator segments includes at least one stator winding and is adapted to build a ring-shaped stator when assembled. At least one cooling means is provided with each of the plurality of stator segments.

17 Claims, 2 Drawing Sheets

STATOR-ARRANGEMENT

CROSS REFERENCE TO RELATED APPLICATIONS

This application claims priority of European Patent Office application No. 10159790.4 EP filed Apr. 13, 2010, which is incorporated by reference herein in its entirety.

FIELD OF INVENTION

The invention relates to a stator-arrangement for a generator comprising a plurality of stator segments each comprising at least one stator winding adapted to build a ring-shaped stator when assembled.

BACKGROUND OF INVENTION

High power generators especially in use of modern wind turbines produce large amounts of heat which have to be dissipated in order to avoid an overheating of the generator. Hence, cooling of such generators is regularly provided with air-based cooling means having advantages due to their simplicity. However, as demands for high power generators also increases the size of these cooling systems the ratio between torque and generator size becomes unfavourable. Liquid cooling offers greater design flexibility than air cooling such as for expansion in the power rating while simultaneously retaining design flexibility such as the possibility of saving raw material. Anyhow, liquid cooling is always connected with additional complexity in the stator assembly of a generator.

US 2009/0026771 A1 refers to a liquid cooled direct drive wind turbine having a cooling jacket comprising tubings wound in helical configuration located between a stator support frame and the stator laminate. The stator assembly is complex and replacement of the cooling tubings is not possible without dismantling of the entire generator. Furthermore, since the tubing is wound in helical configuration around a large stator support structure non-uniform cooling occurs between the ends of the stator which is generally to avoid. At the same time, the stator is only partially liquid cooled as the end windings are surrounded by air, that is they need air cooling. Further, it is not trivial to obtain good thermal contact between the cooling jacket and the stator laminate as large direct drive generators have diameters of more than 4 meters giving rise to a difficult and time-consuming assembly.

The growing demand for large direct drive generators for wind turbines moves the focus from small custom made production to series production focussing reliability, simplicity and costs. In order to ease the assembly of large direct drive generators segmented stators have been proposed.

U.S. Pat. No. 6,781,276 refers to a generator with a stator consisting of a plurality of separate stator modules ready to be individually and independently installed, repaired and dismantled. Hence, it is possible to produce stator segments in advance before the assembly of the generator. However, a considerable amount of manual assembly work is still necessary in order to connect the phases of the segments to the electrical system while at the same time the challenge of providing proper cooling, in particular high efficient liquid-cooling of each stator segment has not been considered.

SUMMARY OF INVENTION

Therefore, it is an object of the invention to provide a stator-arrangement simple in construction and having improved cooling capability.

This is achieved by the above mentioned stator-arrangement, wherein at least one cooling means is provided with each stator segment.

The inventive stator-arrangement solves the problem of overheating which may lead to a reduction in the generator power or in the worst case to a destruction of the generator by means of the cooling means separately located in each stator segment. The cooling means provides proper cooling of the stator segment as a cooling medium favourably a liquid cooling medium such as water for instance, dissipates heat from the stator segment.

According to the invention cooling means are individually provided with each stator segment ensuring that each stator segment may be individually supplied with proper cooling. A fully liquid cooled stator segment is provided where the laminate and the end windings are cooled by using the same cooling channel.

Further, service and maintenance is improved as a stator comprises a series of independent stator segments. A such segmented stator has a benefit that in case of failure the effected stator segment may be replaced at a fraction of the costs and efforts which would be required for the replacement of a complete stator.

Moreover, an optimised generator design can be achieved compared to existing electric machines. The power rating may be improved compared to a similar sized air cooled electric machine or the size of the electric machine can be reduced compared to an air cooled electric machine with the same rating. The use of materials like copper and iron is optimised. There is no longer need for air slits in the stator laminate.

In favour, a cooling means is partly or fully integrated into the stator segment or is attached to the stator segment. Fully integrating the cooling means into the stator segment increases its cooling capacity as cooling exactly takes place where heat arises. In such a manner, the cooling means is enclosed approximately to or even surrounded by the stator windings. Partly integrating the cooling means into the stator segment still leads to good cooling properties of the cooling means as they are still closely contacted to the stator segment. If need be, grooves or the like in the shape of the cooling means for accommodating the cooling means are provided with each stator segment. Attaching the cooling means in close contact to the surface of the stator segment is an easy way of providing cooling for a stator segment. In particular, in cases of maintenance and/or repair cooling means disposed on the outer surface are of advantage as they offer good accessibility. Of course, different types of locations of the cooling means, that is for example integrated in the stator segment and additionally attached on the surface of the stator segment are possible.

The attachment of the cooling means may be provided by fastening means and/or by a thermally conductive material. Fastening means may be brackets, screws, bolts or the like giving rise to a stable and closely contacted attachment of the cooling means to the stator segment that is the stator back iron for example. The stator segments may be equipped with according fastening portions like threads or the like for establishing a ready connection of the cooling means to the stator segments. Clips, retainers, etc. may be used as well. Favourably, the fastening means give rise to a detachable connection of the cooling means. Alternatively or additionally, a thermally conductive material may be used to attach a cooling means to the stator segment, that is the stator back-iron for example, essentially behaving like glue, adhesive or the like. In this manner, the cooling means may be partially or even completely covered by the thermally conductive material building an effective thermal bridge between the cooling means and the rest of the stator segment that is the lamination for example. In general, no cooling tubes need to be welded. The thermally conductive material further provides electrical and environmental isolation of the stator segment, which is of advantage in terms of transport, handling and operation.

Preferably, at least the end windings of each stator segment and the cooling means are at least partially encapsulated by a thermally conductive material. In such a manner, problematic heat accumulation in particular at the end windings may be prevented by means of the thermally conductive material building a thermal bridge as it conveys heat from these "hot spots" to the cooling means. Aside, it is possible that other parts or even the entire stator segment is encapsulated by a thermally conductive material. The thermally conductive material may be a thermally conductive resin. The resin may comprise thermally conductive fibres or other additives enhancing the thermal properties in terms of heat conveyance. The resins are regularly easy to process by casting and subsequent curing. The thermally conductive resin behaves as an electrical isolator. Other thermally conductive material such as thermally conductive and electrically insulating foams for instance may be used as well.

The thermally conductive resin preferably completely fills the gap between the end windings and accordingly guarantees an effective thermal contact between the end windings and the cooling means. A form can be used to enclose the end windings in such a way that the thermally conductive resin can be poured into the form and fills out the gaps between the end windings and other parts of the stator segment that is the stator laminate. The encapsulation of the end windings could be temporarily fitted during the casting process of the resin. The encapsulation may also be a stationary solution that provides extra protecting of the end windings.

The cooling means is preferably a duct-like pipe. Hence, a cooling medium such as water for example may circulate through the duct-like pipe or channel in known manner and provides good heat transfer. The duct-like pipe is in favour of a meander-like shape and is thereby distributed within a stator segment. Preferably, a maximum number of bends are disposed within a stator segment, thus obtaining a maximum surface for heat exchange and further improved cooling of the stator segment. Hence, the material of the duct-like pipe has to assure a certain flexibility and has to be of great thermal conductivity. Hence, duct-like pipes made of copper are applicable, whereby of course all other materials showing similar or like properties may be used as well.

In a further embodiment of the invention, the duct-like pipe is disposed in the longitudinal direction and the bends of the meander-like shaped duct-like pipe are disposed near the end windings of the stator segment. In such a manner cooling properties of the stator segment are further improved as the cooling means in form of the duct-like pipe has a maximum surface and extends through a maximum distance within each stator segment that is the duct-like pipe runs back and forth in preferably longitudinal direction of the stator segment. The bends or U-shaped portions of the meander-like shaped duct-like pipe are preferably disposed near the end windings so as to provide an effective cooling path for the end windings.

Preferably, the bends of the meander-like shaped duct-like pipe longitudinally extend outside the stator segment. That is, the bends project outside the borders of the stator laminate at both ends. In such a manner, it is assured that the end windings may be properly cooled by the cooling means, that is the duct-like pipe.

The duct-like pipe may comprise at least one inlet and at least one outlet for connecting with a cooling liquid providing cooling system. Hence, by means of the cooling system a cooling liquid circulates entering through the inlet, the duct-like pipe itself and streams out at the outlet building a closed circle. Of course, appropriate means as pipes, hoses or the like provide a connection from the cooling system to the inlet or outlet of the duct-like pipe respectively. Preferably, each stator segment, that is each duct-like pipe is separately connected to the cooling system giving rise to a highly individual cooling of each stator segment. Alternatively, it is possible that the duct-like pipes of a group of stator segments are connected in series so that the connection to the cooling system is established through the inlet and outlet of only one specific stator segment. The inlet and outlet of the duct-like pipe uses plug connectors or standard pipe fittings for an easy and tight connection to the pipes or hoses of the cooling system. The cooling system comprises an appropriate control unit for controlling pressure, temperature, flow and all other relevant parameters of the liquid cooling medium.

In favour, at least two electrical connectors for electrically connecting the stator segments are provided with each stator segment. High current connectors known from the power industry may be used as electrical connectors for an easy and fast assembly and dismantling. High current connectors with incorporated safety systems may be provided so that mix ups of the phase connections may be avoided. The electrical connectors can be either screw or bolted terminals. Thus, it is possible to use "standard" power cables for the bus bar connections between the individual stator segments and between the phases and the power converters. Of course, screw or bolt connectors for establishing a connection to solid ring type bus bars may be implemented.

It is of advantage, when the inlet and outlet of the duct-like pipe and the electrical connectors are disposed at the same end of the stator segment. In such a way repair and/or maintenance can be done from one easy accessible end of a stator segment and the electrical machine altogether. This is a great advantage especially in a direct drive wind turbine where the hub is directly mounted to the rotor of the generator and where is only very limited space for maintenance at this end of the machine.

In a further embodiment of the invention the stator segment comprises at least one slot for accommodating the at least one stator winding. Thereby, generally two possible configurations of a stator segment are possible. According to the first configuration a stator segment comprises half as many stator windings or coils as there are slots, whereby one side of the stator winding is deployed in each slot. In this so called single-layer winding configuration each stator winding spans a number of slots equivalent to the pole pitch. According to the second configuration there are as many stator windings as there are slots which would be a so called double layer winding configuration using two stator winding sides to each slot.

It is also possible, that a stator segment comprises at least two stator segment members assemblable to build the stator segment. Hence, a stator segment is not an integral part but consists of at least two halves or members respectively. In such a way it is eased to insert the cooling means into the stator segment, as for example cooling means may be inserted in a first member, which may eventually be provided with a groove or recess like structure for accommodating the cooling means and afterwards a second member is attached to the first member having the cooling means accommodated thereby building a stator segment. Likewise, no complex bore holes have to be provided in the stator segment as it is only necessary to insert certain surface structures into the surface of the stator segment members which build a duct-like or channel-like structure when assembled. Thereby, it is possible that separate duct-like pipes are not necessary anymore. The connection of the stator segment members may be provided by mechanical fastening means such as screws, bolts or the like, otherwise the stator segment members may be for example glued or welded together building the stator segment.

The object of the invention is also achieved by a generator, in particular for a wind turbine, comprising a stator and a rotor, wherein a stator-arrangement as previously disclosed is assembled to build the stator.

BRIEF DESCRIPTION OF THE DRAWINGS

In the following the invention is described in detail as reference is made to the figures, whereby.

DETAILED DESCRIPTION OF INVENTION

Figure 1:
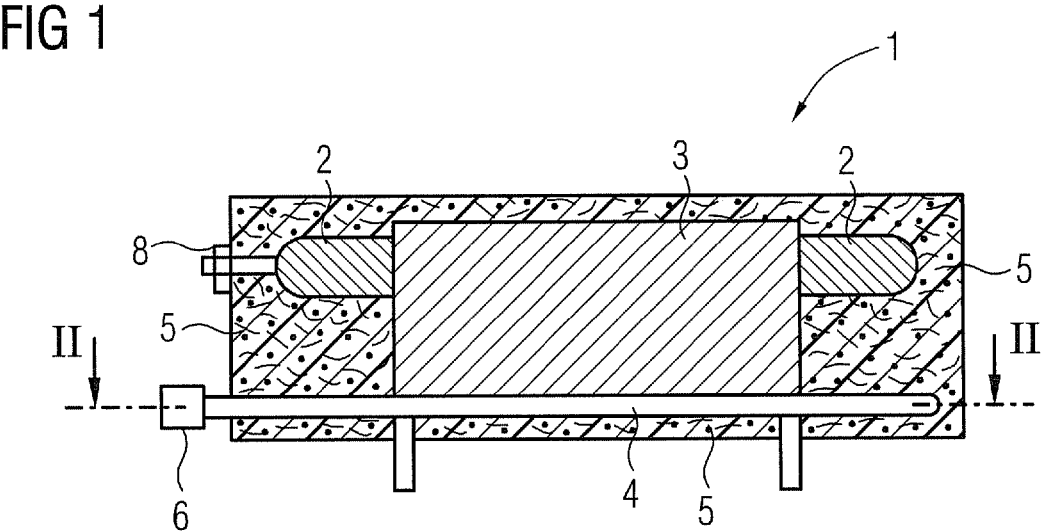
FIG. 1 shows a principle view of a stator segment according to an exemplary embodiment of the invention.

FIG. 1 shows a principle view of a stator segment 1 which represents one part or unit of a not shown stator-arrangement comprising a plurality of stator segments 1 building a ring-shaped stator of a generator in particular for a wind turbine. The stator segment 1 comprises a stator winding whereof only the end windings 2 can be seen in FIG. 1 as the stator windings are encased by the stator laminate 3. The stator segment 1 comprises a cooling means in form of a duct-like pipe 4 made of copper having a meander-like shape (cf. FIG. 2). The duct-like pipe 4 is attached to the stator segment 1 as the entire stator segment 1 is surrounded or encapsulated by a thermally conductive and electrically insulating material in form of a resin 5 having an electrical insulating matrix containing a powdery, highly thermally conductive filler in form of aluminium powder for instance. Thus, protection against environmental impact, transportation and during handling and operation is given. The resin 5 behaves like an adhesive, it sticks the duct-like pipe 4 to the surface of the stator segment 1 that is the stator laminate 3. Additionally, brackets or clips could be used to further strengthening the connection of the duct-like pipe 4 to the stator laminate 3.

As the entire stator segment 1 is encapsulated by the thermally conductive and electrically insulating resin 5 the gap between the end windings 2 and the duct-like pipe 4 is also filled with resin 5, which builds a thermal bridge between the end windings 2 and the duct-like pipe 4 avoiding heat accumulation in this portion of the stator segment 1. Moreover, the encapsulation of the end windings 2 by means of the resin 5 may provide an IP-protection (IP=International Protection according to IEC 60529 relating to the degrees of protection provided against the intrusion of solid objects in terms of electrical devices) where a panel mount socket for each phase is mounted in the encapsulation for connections to corresponding IP-protected cable plugs. The stator segment 1 may be entirely IP-protected and no extra insulation work of the end windings 2 would be necessary.

The duct-like pipe 4 is connected to a cooling liquid providing cooling system (not shown) through inlets 6 and outlets 7 (cf. FIG. 2) by means of appropriate cooling liquid supply means as hoses, channels or the like. The cooling system provides a cooling liquid such as water for example and controls all relevant parameters of the cooling liquid like temperature, pressure, flow, etc. Thus, ensuring proper cooling of the stator segment 1 at all times.

At the same endings of the stator segment 1 (that is the left ending with reference to FIG. 1) the end windings 2 comprise high current electrical connectors 8 for each phase allowing a series or parallel connection of stator segments 1. Hence, maintenance and/or repair of the stator segment 1 is facilitated as it can be executed from the same end of the generator because all stator segments 1 of the stator of the generator are preferably disposed in the same manner.

Figure 2:
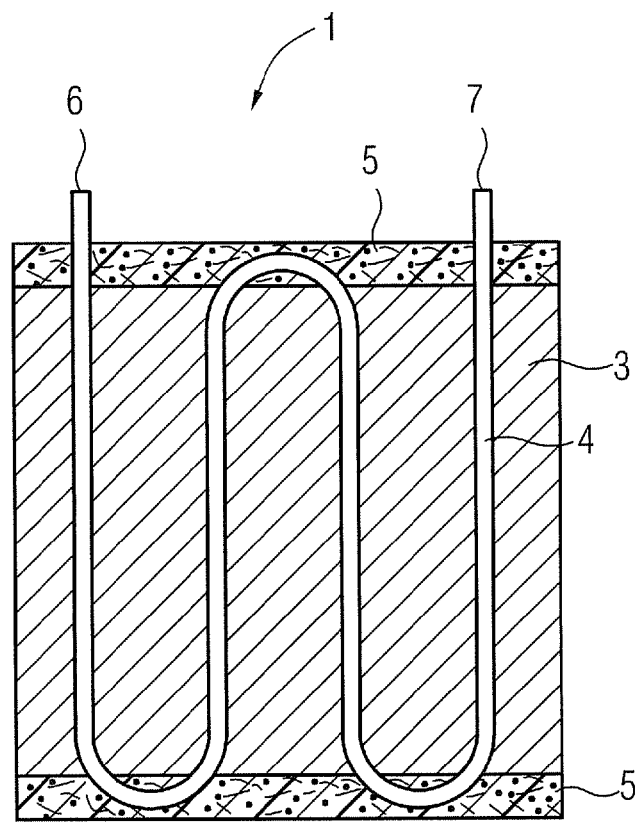
FIG. 2 shows a principle longitudinally cut view of a stator segment according to an exemplary embodiment of the invention.

According to FIG. 2 only the end windings 2 of the stator segment 1 are encapsulated by the semi-conductive but electrically insulating resin 5. A thermal bridge between the end windings 2 and the duct-like pipe 4 is still established. As clearly depicted in FIG. 2 the duct-like pipe 4 has a meander-like shape, i.e. comprises a number of "lamellae" whereby the duct-like pipe 4 is longitudinally disposed within the stator segment 1 and the bends of the meander-like shaped duct-like pipe 4 are arranged near the end windings 2 of the stator segment 1. For accomplishing further improved cooling properties the bends of the meander-like shaped duct-like pipe 4 extend outside the stator laminate 3 and accordingly the stator segment 1. Although FIG. 2 shows only three bends of the meander-like shaped duct-like pipe 4 of course more or less bends could be employed, whereby in case of more bends the cooling properties of the stator segment 1 may be further increased.

Figure 3:
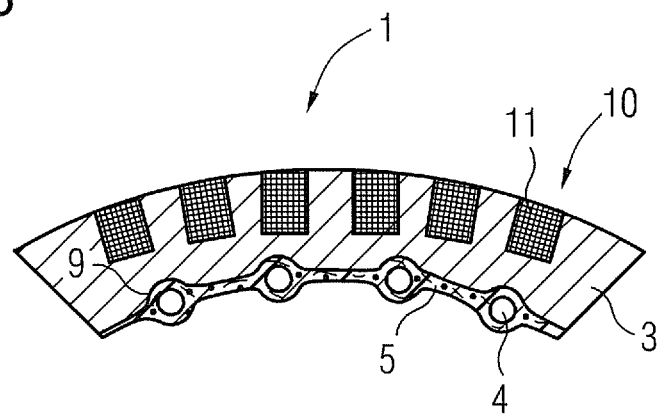
FIG. 3 shows a principle cross-sectional view of a stator segment according to an exemplary embodiment of the invention.

FIG. 3 shows a principle cross-sectional view of a stator segment 1 according to an exemplary embodiment of the invention. As can be seen, the stator segment 1 has a slightly rounded shape giving rise to build a ring-shaped stator when an appropriate number of stator segments 1 have been assembled. Grooves 9 are disposed within the surface of the stator laminate 3 for proper accommodating the duct-like pipe 4. Further, the duct-like pipe 4 is attached to the stator laminate 3 i.e. sticks to the stator laminate 3 by means of the resin 5. The stator segment 1 comprises six slots 10 for accommodating stator windings 11. In this embodiment the stator segment 1 has a so called double-layer winding configuration, that is there are as many slots 10 as stator windings 11.

Figure 4:
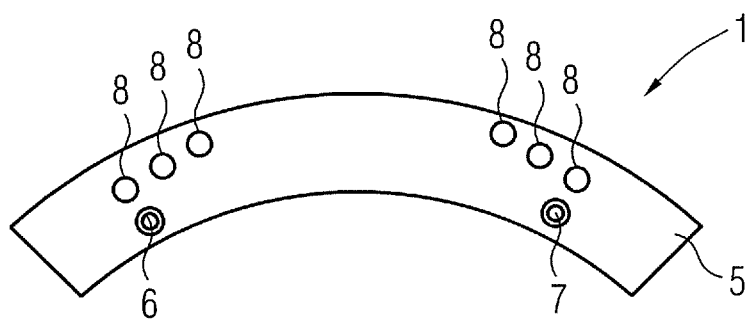
FIG. 4 shows a principle front view of a stator segment according to an exemplary embodiment of the invention.

FIG. 4 shows a principle front view of a stator segment according to an exemplary embodiment of the invention depicting that the inlets 6 and the outlets 7 of the duct-like pipe 4 and the electrical connectors 8 are disposed at the same end of the stator segment 1, thereby assuring great accessibility of the stator segment 1 which is of great advantage in terms of maintenance and/or repair.

Figure 5:
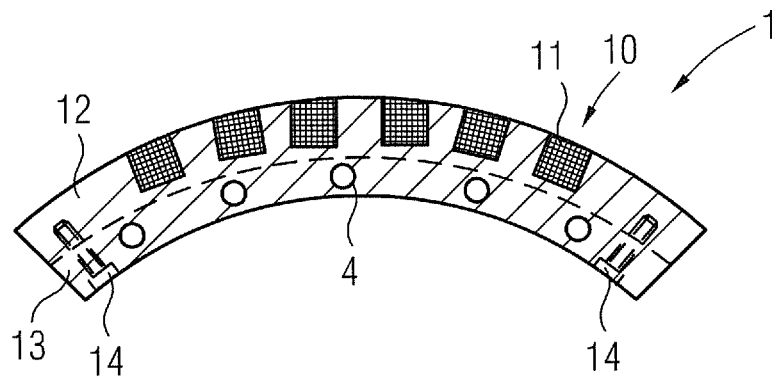
FIG. 5 shows a principle cross-sectional view of the stator segment according to another exemplary embodiment of the invention.

FIG. 5 shows a principle cross-sectional view of a stator segment 1 according to another embodiment of the invention. Indicated by dotted lines is that the stator segment 1 comprises two, that is an upper and a lower stator segment members 12, 13, whereby the upper stator segment member 12 accommodates the slots 10 and consequently the stator windings 11 and the lower stator segment member 13 accommodates the cooling means in form of the duct-like pipe 4. Preferably, the lower stator segment member 13 is adapted to employ the duct-like pipe 4 as recesses, grooves or the like are provided with its structure. Of course, a reversed arrangement is also possible. It is also possible that the grooves, recesses or the like integrally build the duct-like pipe 4 that is an extra insertion of a duct-like pipe 4 is not necessary.

A stable and preferably detachable connection of the stator segment members 12, 13 is provided by fastening means in form of screws 14 and/or adhesives (not shown) for example.

With the present invention stator assembly time may be significantly reduced as the stator is assembled by a number of complete and preassembled stator segments 1 each comprising a cooling means in form of a duct-like pipe 4 with an adequate cooling liquid flowing in it and further comprising electrical connectors 8 for each phase. Further, eased maintenance and service of stator segments 1 and accordingly the stator is obtained. The present stator-arrangement comprising a number of stator segments 1 is preferably used as a stator in a generator for a wind turbine.

The invention claimed is:

1. A stator-arrangement for a generator, comprising:
   a plurality of stator segments, each of the plurality of stator segments comprising a plurality of radial portions attached to one another, the plurality of radial portions includes a first radial portion and a second radial portion,
   a first radial portions comprising at least one stator winding; and
   a second radial portion comprising at least one cooling means,
   wherein the plurality of stator segments are attached to build a ring-shaped stator.

2. The stator-arrangement according to claim 1, wherein the cooling means is at least partly integrated into the stator segment or is attached to the stator segment.

3. The stator-arrangement according to claim 2, wherein the cooling means is fully integrated into the stator segment.

4. The stator-arrangement according to claim 1, wherein the cooling means is attached to the stator segment.

5. The stator-arrangement according to claim 4, wherein the attachment of the cooling means is provided by fastening means and/or by a thermally conductive material.

6. The stator-arrangement according to claim 1, wherein at least the end windings of each of the plurality of stator segment and the cooling means are at least partially encapsulated by a thermally conductive material.

7. The stator-arrangement according to claim 6, wherein the thermally conductive material is a thermally conductive resin.

8. The stator-arrangement according to claim 1, wherein the cooling means is a duct-like pipe.

9. The stator-arrangement according to claim 6, wherein the duct-like pipe has a meander-like shape.

10. The stator-arrangement according to claim 9, wherein the duct-like pipe is disposed in the longitudinal direction and the bends of the meander-like shaped duct-like pipe are disposed near the end windings of the stator segment.

11. The stator-arrangement according to claim 9, wherein the bends of the meander-like shaped duct-like pipe longitudinally extend outside the stator segment.

12. The stator-arrangement according to claim 8, wherein the duct-like pipe comprises at least one inlet and at least one outlet for connecting with a cooling liquid providing cooling system.

13. The stator-arrangement according to claim 1, wherein each of the plurality of stator segments comprises at least two electrical connectors for electrically connecting the stator segments.

14. The stator-arrangement according to claim 8, wherein the inlet and outlet of the duct-like pipe and the electrical connectors are disposed at the same end of the stator segment.

15. The stator-arrangement according to claim 1, wherein the stator segment comprises at least one slot for accommodating the at least one stator winding.

16. The stator-arrangement according to claim 1, wherein the stator segment comprises at least two stator segment members to build the stator segment.

17. A wind turbine generator, comprising:
    a rotor; and
    a stator wherein the stator is formed from a stator arrangement according to claim 1.

* * * * *